(12) United States Patent
Kobayashi et al.

(10) Patent No.: US 9,794,537 B2
(45) Date of Patent: Oct. 17, 2017

(54) IMAGE PROCESSING METHOD AND IMAGE PROJECTION DEVICE

(71) Applicant: SONY CORPORATION, Tokyo (JP)

(72) Inventors: Naoki Kobayashi, Tokyo (JP);
Yohsuke Kaji, Chiba (JP); Naomasa Takahashi, Chiba (JP); Takashi Norizuki, Chiba (JP)

(73) Assignee: SONY CORPORATION, Tokyo (JP)

( * ) Notice: Subject to any disclaimer, the term of this patent is extended or adjusted under 35 U.S.C. 154(b) by 367 days.

(21) Appl. No.: 14/570,129

(22) Filed: Dec. 15, 2014

(65) Prior Publication Data

US 2015/0187057 A1 Jul. 2, 2015

(30) Foreign Application Priority Data

Dec. 26, 2013 (JP) .................. 2013-268761

(51) Int. Cl.
*H04N 9/31* (2006.01)
*G03B 21/14* (2006.01)

(52) U.S. Cl.
CPC ......... *H04N 9/3185* (2013.01); *G03B 21/147* (2013.01); *H04N 9/3194* (2013.01)

(58) Field of Classification Search
CPC .... G03B 21/005; G03B 21/28; G03B 21/147; H04N 9/3182; H04N 9/3185; H04N 9/3194; G02B 27/0025; G02B 27/0031
See application file for complete search history.

(56) References Cited

U.S. PATENT DOCUMENTS

| | | | |
|---|---|---|---|
| 6,592,228 B1* | 7/2003 | Kawashima | G03B 21/11 348/745 |
| 8,476,569 B2* | 7/2013 | Konno | G02B 26/0841 250/208.1 |
| 2005/0041216 A1* | 2/2005 | Kobayashi | H04N 9/3182 353/69 |
| 2005/0162624 A1* | 7/2005 | Miyasaka | G03B 21/26 353/101 |
| 2013/0162521 A1* | 6/2013 | Lee | H04N 9/3194 345/156 |

* cited by examiner

*Primary Examiner* — Sultan Chowdhury
(74) *Attorney, Agent, or Firm* — Chip Law Group

(57) ABSTRACT

There is provided an image processing method including detecting a distorted image before correction projected on a screen by a projection-type image display device, searching for a same shape as an input image having a maximum area inside the distorted image, and correcting the input image in a manner that the distorted image becomes the searched-for shape having the maximum area.

12 Claims, 16 Drawing Sheets

IMAGE PROCESSING METHOD AND IMAGE PROJECTION DEVICE

CROSS REFERENCE TO RELATED APPLICATIONS

This application claims the benefit of Japanese Priority Patent Application JP 2013-268761 filed Dec. 26, 2013, the entire contents of which are incorporated herein by reference.

BACKGROUND

A technology disclosed in the present specification relates to an image processing method and an image projection device that processes an image for projecting a reproduced image of media or a computer screen, for example, on a screen, and particularly to an image processing method and an image projection device that corrects geometrical distortion of an image projected on a screen.

Recently, there have been more occasions in which images received by a television, images reproduced from media such as a Blu-ray Disc, and personal computer (PC) screens, for example, are projected on a large-sized screen using a projection-type image display device so that a plurality of persons view them or make presentations. In addition, there also exists a small-sized projection-type image display device (pico-projector) that is used on a palm or mounted on a mobile device system.

When an image is projected on a screen, there occurs a problem of geometrical distortion in which the image is projected in a shape different from a shape of an original image, such as distortion of an image projected diagonally relative to a projected body (a screen wall face, for example) in a trapezoidal shape. The automatic correction function of geometrical distortion of a projection image generally includes projection of a test pattern on a screen, photographing of an image of the test pattern projected on the screen with an incorporated camera, obtaining of three-dimensional information based on the obtained positions of four corners of the screen and positions of four corners of the test pattern, and correction of geometrical distortion of the projection image (see JP 2011-193332A, for example). When a projection image is distorted in a trapezoidal shape in a vertical direction, the projective transformation is performed so that a display image is intentionally distorted in an opposite direction to geometrical distortion of the projection image on a screen, whereby a presentation image projected on the screen has the shape same as the shape of the original image (a quadrangle, for example).

The distorted image before correction projected on the screen by the projection-type image display device corresponds to a projectable maximum range. Therefore, it may be necessary to form a presentation image projected on the screen after correction, inside the distorted image before correction.

For example, there is proposed a projector in which correction frame image signals corresponding to an outline of an image after the trapezoidal distortion of a projection image is corrected are generated and a correction frame image by the correction frame image signals is displayed on the projection image by input image signals, so as to compare the size of the projection image after correction of trapezoidal distortion with the size of the projection image before correction (see JP 2009-251542A, for example).

SUMMARY

It is desirable to provide an excellent image processing method and image projection device capable of appropriately correcting geometrical distortion of an image projected on a screen.

The present disclosure has been made in view of the above problems, and according to an embodiment of the present disclosure, there is provided an image processing method including detecting a distorted image before correction projected on a screen by a projection-type image display device, searching for a same shape as an input image having a maximum area inside the distorted image, and correcting the input image in a manner that the distorted image becomes the searched-for shape having the maximum area.

According to another embodiment of the present disclosure, the image processing method is configured such that the detecting step detects the distorted image based on an image obtained by photographing the distorted image before correction projected on the screen with a camera, or three-dimensional position relation between the projection-type image display device and the screen.

According to another embodiment of the present disclosure, the image processing method according to the above embodiment is configured such that the detecting step detects a position and a size of a distorted quadrangle projected on the screen, and the searching step searches for a rectangle having the maximum area with a same aspect ratio as the input image, inside the distorted quadrangle.

According to another embodiment of the present disclosure, the image processing method according to the above embodiment is configured such that the searching step searches for a center position from which a minimum value of a distance, in a direction of a diagonal line to a side of the distorted quadrangle, is maximum, and determines a maximum rectangle with the aspect ratio inscribed in the distorted quadrangle with the center position, as the rectangle having the maximum area.

According to another embodiment of the present disclosure, the image processing method according to the above embodiment is configured such that the searching step calculates boundary conditions for searching for the center position regarding respective sides of the distorted quadrangle, searches for the center position from which a minimum value of distances, in a direction of a diagonal line to the respective sides of the distorted quadrangle, is maximum, and determines the maximum rectangle with the aspect ratio inscribed in the distorted quadrangle with the center position, the center position satisfying all boundary conditions.

According to another embodiment of the present disclosure, the image processing method according to the above embodiment is configured such that the searching step calculates a boundary condition regarding a side n by a form of an equation representing a boundary plane in a three-dimensional space including the side n and a point (x, y, z) with a z axis that is a distance from the center position (x, y, 0) to an intersection point between the side n and a diagonal line of the rectangle with the center position (x, y, 0) set arbitrarily inside the distorted quadrangle.

According to another embodiment of the present disclosure, the image processing method according to the above embodiment is configured such that the searching step calculates, for each side, a solution candidate satisfying all the boundary conditions regarding sides other than a focused side, and selects an optimum solution among the solution candidates of respective sides.

According to another embodiment of the present disclosure, the image processing method according to the above embodiment is configured such that the searching step sets, as the solution candidate regarding the focused side, a smaller z of either a largest z satisfying the boundary conditions regarding all the sides other than the focused side or a z satisfying the boundary condition regarding the focused side with (x, y) at that time.

According to another embodiment of the present disclosure, the image processing method according to the above embodiment is configured such that the searching step calculates a z of an intersection point of three boundary planes respectively representing the boundary conditions regarding all the sides other than the focused side, as a largest z satisfying the boundary conditions regarding all the sides other than the focused side.

According to another embodiment of the present disclosure, the image processing method according to the above embodiment is configured such that the searching step selects a solution candidate allowing a largest z among all the solution candidates calculated for respective sides, as an optimum solution, and finds, as the rectangle having the maximum area, a maximum rectangle inscribed in the distorted quadrangle with (x, y) corresponding to the optimum solution as the center position.

According to another embodiment of the present disclosure, there is provided an image projection device including a projection unit configured to project an input image, a detection unit configured to detect a distorted image before correction projected on a screen by a projection-type image display device, a search unit configured to search for a same shape as the input image having a maximum area inside the distorted image, and a correction unit configured to correct the input image in a manner that the distorted image becomes the searched-for shape having the maximum area.

According to another embodiment of the present disclosure, the image processing device according to the above embodiment is configured such that the detection unit detects a position and a size of a distorted quadrangle projected on the screen, and the search unit includes a boundary condition calculation unit configured to calculate boundary conditions regarding four sides of the distorted quadrangle, a solution candidate calculation unit configured to calculate, for each side of the distorted quadrangle, a solution candidate satisfying the boundary conditions of all sides other than a focused side, and an optimum solution selection unit configured to select an optimum solution among the solution candidates calculated for the respective sides of the distorted quadrangle.

According to another embodiment of the present disclosure, the image processing device according to the above embodiment is configured such that the boundary condition calculation unit calculates a boundary condition regarding a side n by a form of an equation representing a boundary plane in a three-dimensional space including the side and a point (x, y, z) with a z axis that is a distance from the center position (x, y, 0) to an intersection point between the side n and a diagonal line of a rectangle with the center position (x, y, 0) set arbitrarily inside the distorted quadrangle.

According to another embodiment of the present disclosure, the image processing device according to the above embodiment is configured such that the solution candidate calculation unit sets, as the solution candidate regarding the focused side, a smaller z of either a largest z satisfying the boundary conditions regarding all the sides other than the focused side or a z satisfying the boundary condition regarding the focused side with (x, y) at that time.

According to another embodiment of the present disclosure, the image processing device according to the above embodiment is configured such that the optimum solution selection unit selects a solution candidate allowing a largest z among all the solution candidates calculated for respective sides, as an optimum solution, and finds, as a rectangle having a maximum area, a maximum rectangle inscribed in the distorted quadrangle with (x, y) corresponding to the optimum solution as the center position.

According to the technology disclosed in the present specification, it is possible to provide an excellent image processing method and image projection device capable of appropriately correcting geometrical distortion of an image projected on a screen.

According to the technology disclosed in the present specification, it is possible to provide an excellent image processing method and image projection device capable of appropriately correcting geometrical distortion of a projection image so that a presentation image projected on a screen after correction has a maximum area. Therefore, according to the technology disclosed in the present specification, it is possible to effectively utilize an area projectable by the image projection device.

Note that the effects described in the present specification are merely examples, and the effects of the present disclosure are not limited thereto. Moreover, the present disclosure may exert additional effects other than the above-described effects. Other intentions, features, and advantages of the technology disclosed in the present specification will become clear by the following detail description based on the later-described embodiment and appended drawings.

DETAILED DESCRIPTION OF THE EMBODIMENT(S)

Figure 1:
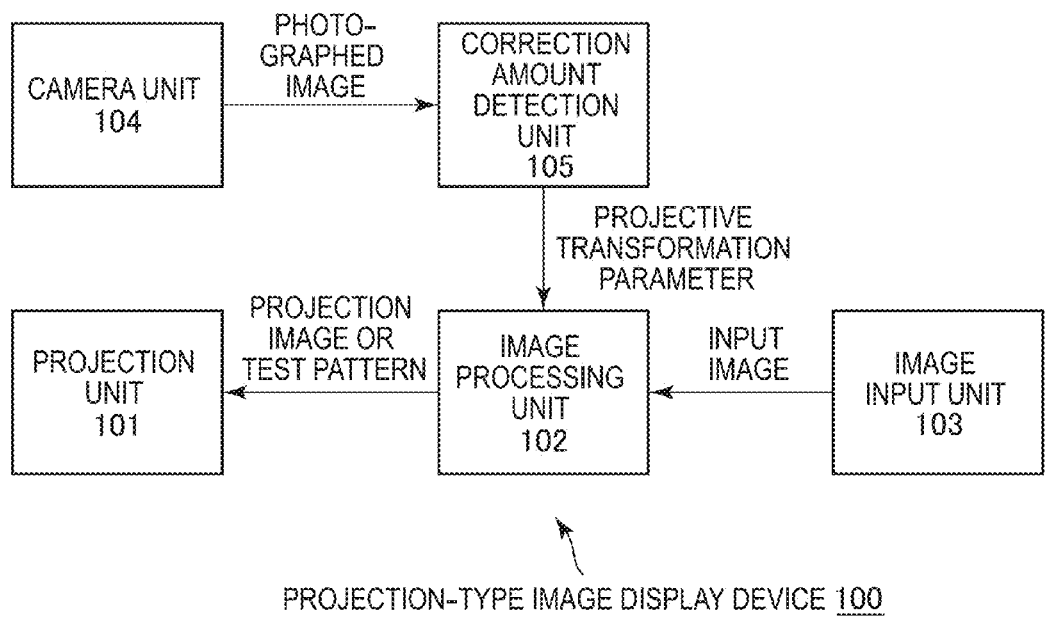
FIG. 1 is a diagram schematically illustrating a configuration of a projection-type image display device 100 according to an embodiment of the technology disclosed in the present specification.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

FIG. 1 schematically illustrates a configuration of the projection-type image display device 100 according to an embodiment of the technology disclosed in the present specification. The projection-type image display device 100 illustrated in FIG. 1 includes a projection unit 101, an image processing unit 102, an image input unit 103, a camera unit 104, and a correction amount detection unit 105. Hereinafter, each unit will be described.

The image input unit 103 inputs an image signal from a projection image supply source such as a personal computer, a television (TV) receiver, a Blu-ray Disc disk reproducing device, and a game machine (any of them is not illustrated).

The image processing unit 102 processes an image projected from the projection unit 101. The image output from the image processing unit 102 is an external image supplied from the image input unit 103 and a test pattern generated in the image processing unit 102. The image processing unit 102 also corrects distortion of a projection image based on correction parameters supplied from the correction amount detection unit 105. The distortion of the projection image includes geometrical distortion such as trapezoidal distortion based on the three-dimensional position relation between the projection unit 101 and a projected body, and optical distortion caused by an optical system of the projection unit 101 or the camera unit 104. In the following description, the distortion to be corrected is limited to geometrical distortion.

The projection unit 101 projects an image output from the image processing unit 102 on a body to be projected such as a screen (not illustrated). When the projection unit 101 projects the image diagonally relative to the screen, geometrical distortion such as trapezoidal distortion is occurred in a projection image before correction.

The camera unit 104 photographs a test pattern projected on the screen without correction by the projection unit 101. The correction amount detection unit 105 calculates, using the test pattern image photographed with the camera 104, a correction amount for correcting geometrical distortion included in the projection image from the projection unit 101, and outputs the correction amount to the image processing unit 102. The geometrical distortion can be corrected by performing projective transformation on an output image. The correction amount detection unit 105 calculates, as a correction amount, projective transformation parameters for projective transformation of a distorted image to a desired presentation image.

The camera unit 104 is disposed at a position different from an irradiation position of the projection unit 101, and an optical axis is set such that an imaging range includes an irradiation range of the projection unit 101 as much as possible. When the projection unit 101 projects a certain test pattern, the camera unit 104 photographs it. Then, the correction amount detection unit 105 finds a distance and a direction to a body to be projected based on the photographed image, calculates projective transformation parameters, and outputs them to the image processing unit 102. Subsequently, the image processing unit 102 performs projective transformation on all images input from the image input unit 103 using the projective transformation parameters, and the projection unit 101 irradiates images whose geometrical distortion has been corrected.

Note that when the object to be corrected is limited to geometrical distortion, the camera unit 104 photographing a projection image is not always necessary, and can be substituted by another method of measuring a position and a size of a projection image by the projection unit 101 based on the three-dimensional position relation between the projection unit 101 and a screen, for example.

Figure 2:
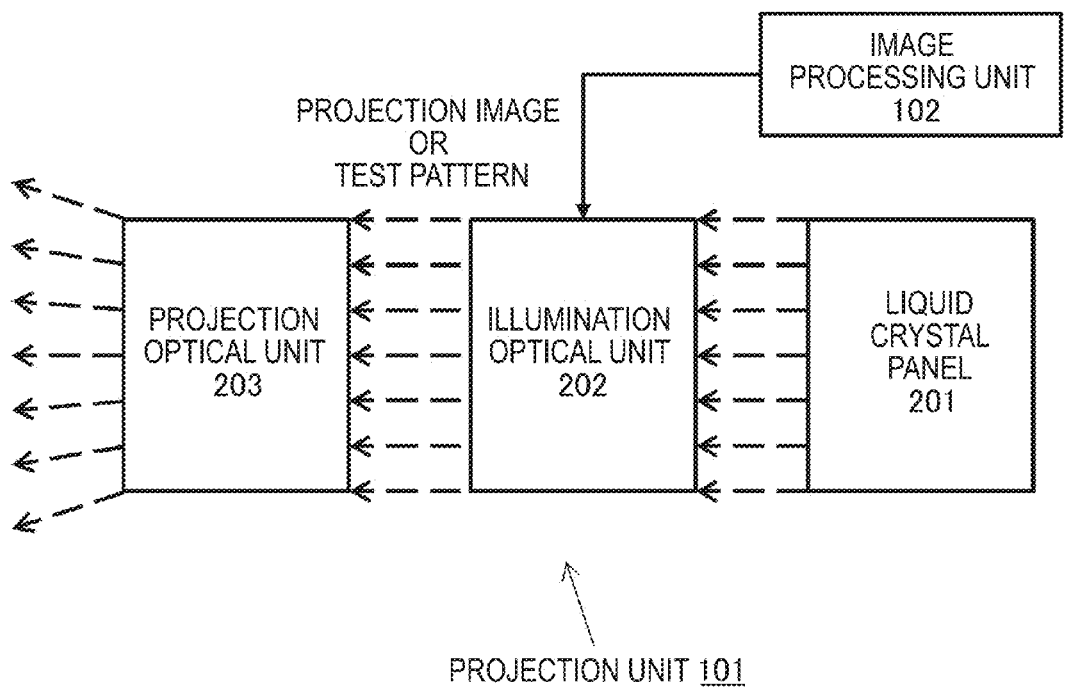
FIG. 2 is a diagram illustrating an inner configuration example of a projection unit 101.

FIG. 2 illustrates an inner configuration example of the projection unit 101. The projection unit 101 illustrated in FIG. 2 includes a liquid crystal panel 201, an illumination optical unit 202, a liquid crystal panel drive unit 204, and a projection optical unit 203. The liquid crystal panel drive unit 204 drives the liquid crystal panel 201 based on an image signal input from the image processing unit 102 so that a projection image or a test pattern is drawn on a display screen of the liquid crystal panel 201. However, the test pattern is drawn without distortion correction, and the input image is drawn after distortion correction. The illumination optical unit 202 irradiates the liquid crystal panel 201 from the back face. When the projection-type image display device 100 is a pico-projector, a light emitting diode (LED) or laser, for example, is used as a light source of the illumination optical unit 302.

The projection optical unit 203 performs enlarged projection of light passing through the liquid crystal panel 201 on a screen (not illustrated). The projection optical unit 203 includes one or two or more optical lenses. It is assumed that the projection optical unit 203 has lens distortion and optical distortion in addition to geometrical distortion is occurred in a projection image. However, the following description will not consider optical distortion.

The projection unit 101 projects an input image to the image input unit 103 or a test pattern generated in the projection-type image display device 100. The test pattern is projected on a screen as a distorted image without distortion correction, while the input image is subjected to distortion correction, and projected on a screen as a presentation image having the same shape as the input image.

Figure 3:
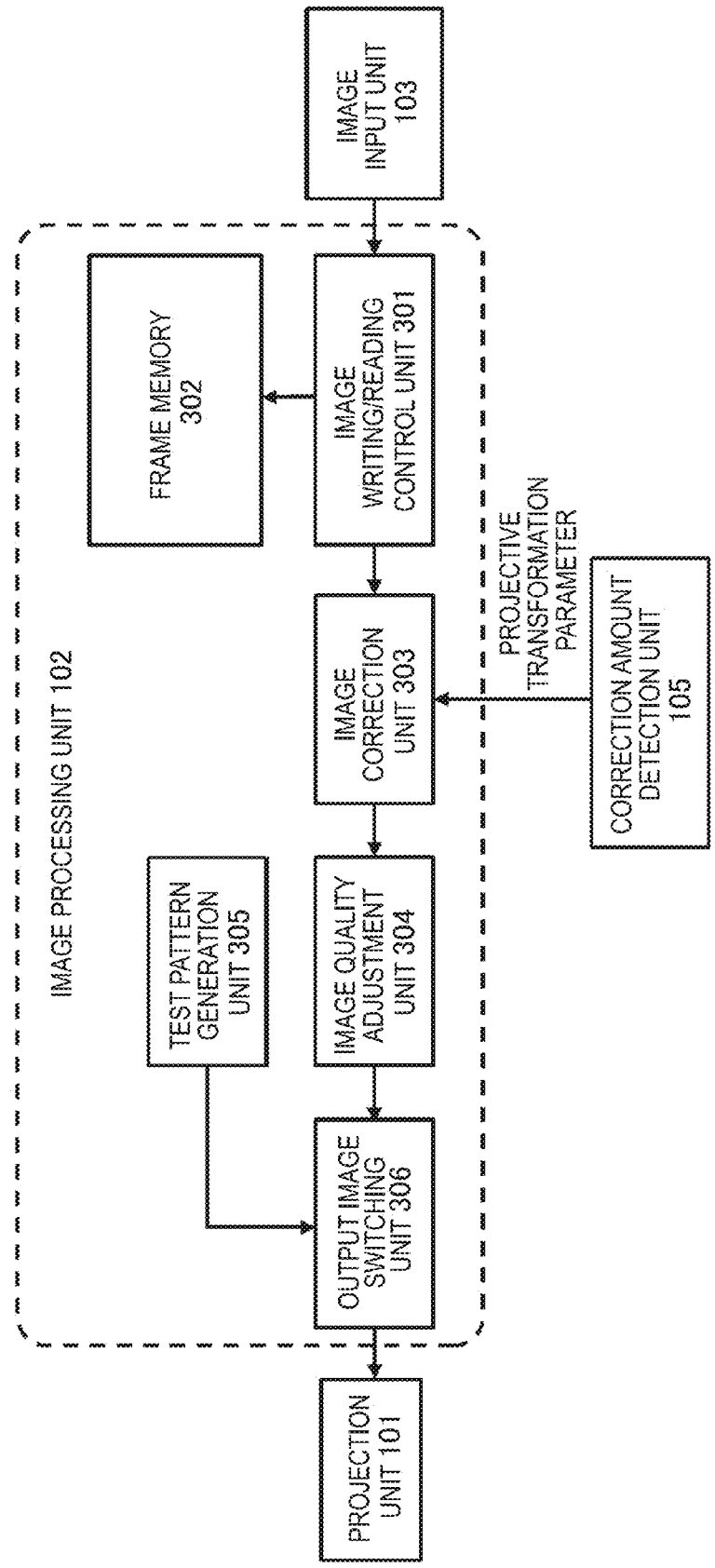
FIG. 3 is a diagram illustrating an inner configuration example of an image processing unit 102.

FIG. 3 illustrates an inner configuration example of the image processing unit 102. The image processing unit 102 illustrated in FIG. 3 includes an image writing/reading control unit 301, a frame memory 302, an image correction unit 303, an image quality adjustment unit 304, a test pattern generation unit 305, and an output image switching unit 305. The frame memory 302 stores images supplied from the image input unit 103. The image writing/reading control unit 301 controls writing and reading of image frames relative to the frame memory 302.

The image correction unit 303 performs projective transformation of an image read out from the frame memory 302 based on projective transformation parameters received from the correction amount detection unit 105, and corrects the image to solve geometrical distortion when projected on a body to be projected by the projection unit 101.

The image quality adjustment unit 304 performs image quality adjustment of brightness, contrast, synchronization, tracking, color density, and color tone, for example, so that the projection image after distortion correction is in a desired display state. The test pattern generation unit 305 generates a test pattern used when the correction amount detection unit 105 calculates projective transformation parameters. The test pattern generally has a geometrical form that makes it easy to obtain three-dimensional information of a screen (not illustrated) as a body to be projected.

The output image switching unit 306 switches images output to the projection unit 101. For example, when input images from an image supply source such as a personal computer, a TV receiver, a media reproducing device, and a game machine (any of them is not illustrated) are projected on a screen to make a presentation, for example, the output image switching unit 306 outputs output images from the image quality correction unit 304 to the projection unit 101. Moreover, when projective transformation parameters for correcting geometrical distortion of a projection image are calculated, the output image switching unit 306 outputs a test pattern generated by the test pattern generation unit 305 to the projection unit 101.

Figure 4:
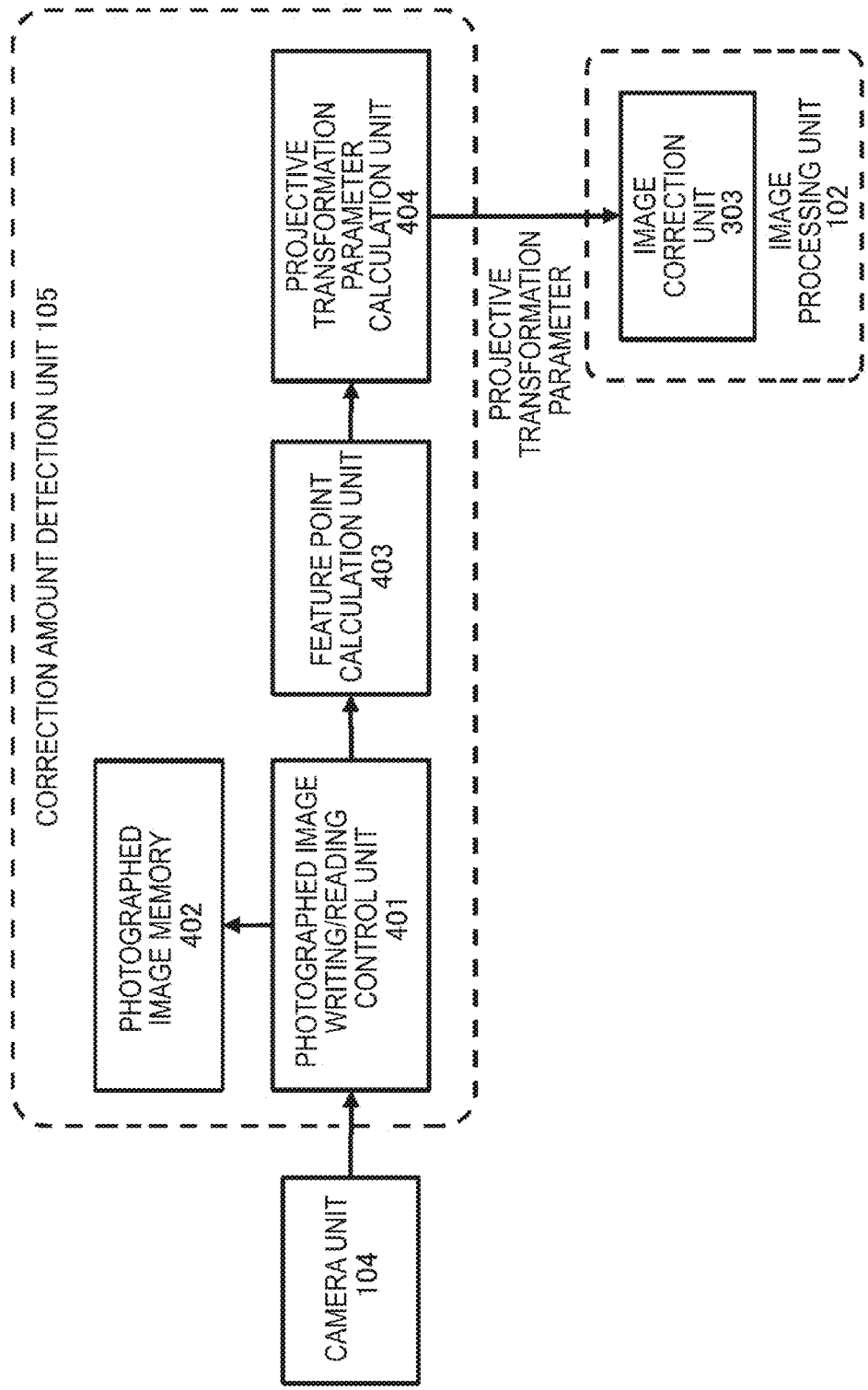
FIG. 4 is a diagram illustrating an inner configuration example of a correction amount detection unit 105.

FIG. 4 illustrates an inner configuration example of the correction amount detection unit 105. The correction amount detection unit 105 illustrated in FIG. 4 includes a photographed image writing/reading control unit 401, a photographed image memory 402, a feature point calculation unit 403, and projective transformation parameters calculation unit 404. The photographed image memory 402 stores photographed images obtained by photographing a screen (not illustrated) with the camera unit 104. The camera unit 104 photographs a projection image of a test pattern projected on the screen. The photographed image writing/reading control unit 401 controls writing and reading of photographed images relative to the photographed image memory 402.

The feature point calculation unit 403 finds coordinates of feature points such as four corners of a test pattern included in a photographed image, using the photographed image read out from the photographed image memory 402. Then, the projective transformation parameter calculation unit 404 finds a distance and a direction to the screen from the projection unit 101 based on the calculated coordinates of feature points, and calculates projective transformation parameters for correcting geometrical distortion of an image projected on the screen. In order to correct geometrical distortion as described later, the feature point calculation unit 403 only has to calculate four vertices of a distorted quadrangle before correction projected on the screen.

The distorted image before correction projected on the screen by the projection unit 101 is generally a distorted quadrangle such as a trapezoid (hereinafter, referred to as a "distorted quadrangle"), and corresponds to a projectable maximum range. Therefore, it may be necessary to form a presentation image for projecting an input image on the screen, inside the distorted image before correction. For example, when the input image is a rectangle with an aspect ratio of 16:9 (hereinafter, referred to as a "16:9 rectangle"), a 16:9 rectangle is searched for inside the distorted quadrangle. Then, the geometrical distortion is corrected by performing projective transformation of the input image such that the distorted quadrangle becomes a presentation image of the 16:9 rectangle.

Figure 5:
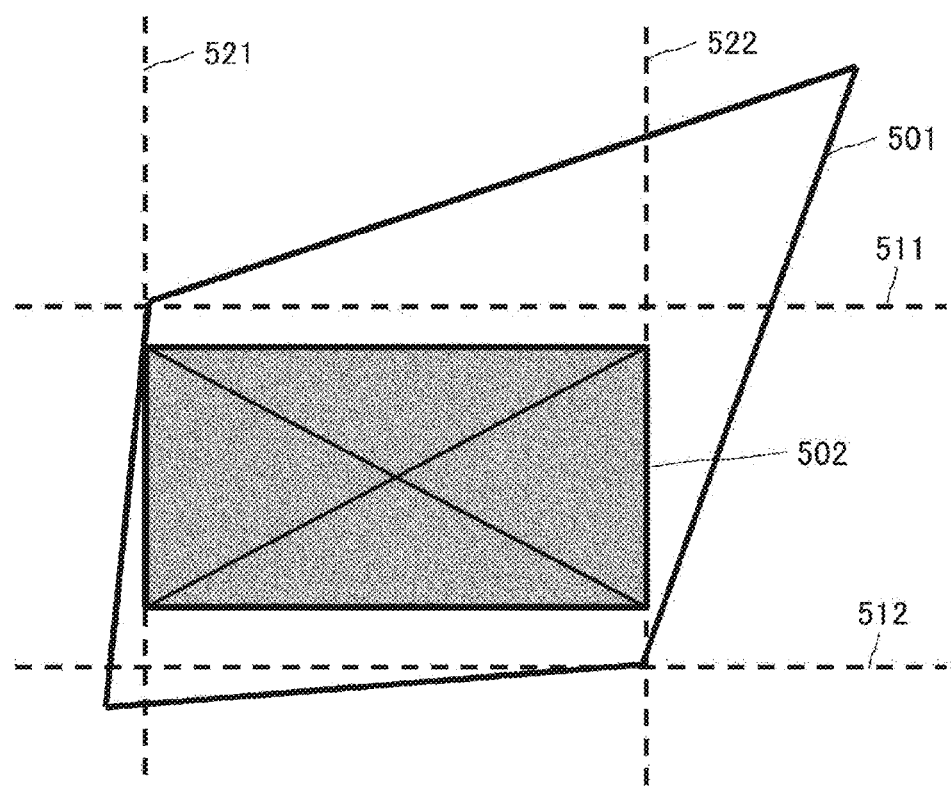
FIG. 5 is a diagram for explaining a method of searching for a 16:9 rectangle 502 inside a distorted quadrangle 501.
Figure 6:
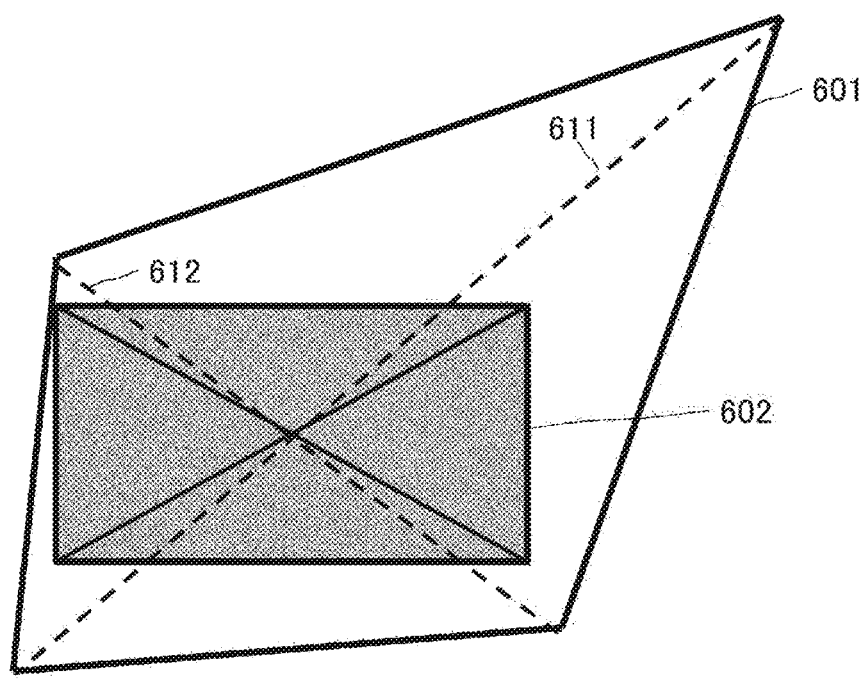
FIG. 6 is a diagram for explaining a method of searching for a 16:9 rectangle 602 inside a distorted quadrangle 601.
Figure 7:
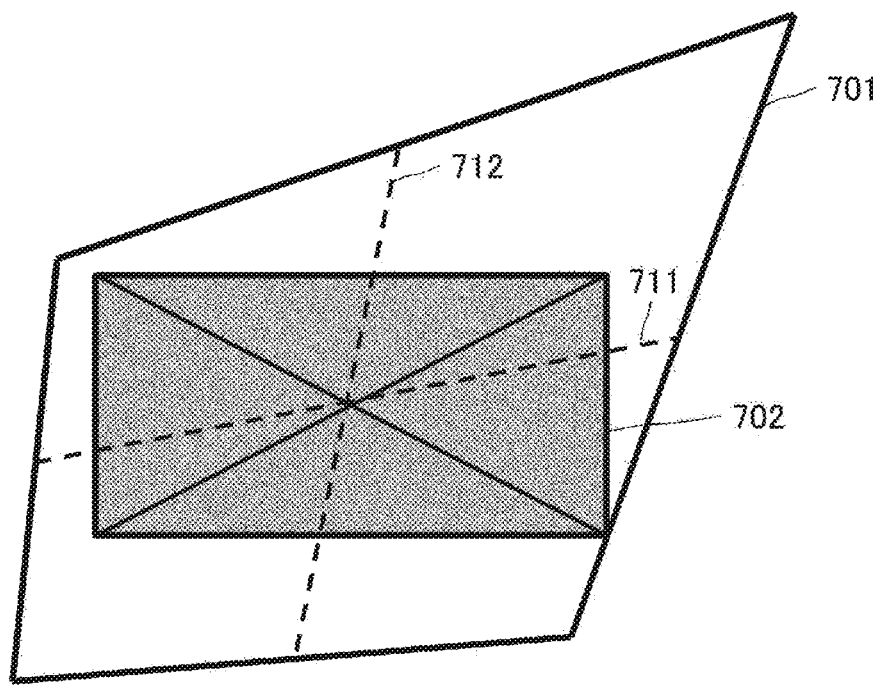
FIG. 7 is a diagram for explaining a method of searching for a 16:9 rectangle 702 inside a distorted quadrangle 701.

FIG. 5 to FIG. 7 respectively exemplify methods of searching for 16:9 rectangles 502, 602, 702 inside distorted quadrangles 501, 601, 701. In the example illustrated in FIG. 5, a maximum 16:9 rectangle 502 is set with the most inner sides of four sides of the distorted quadrangle 501 as limits. The most inner sides of four sides of the distorted quadrangle 501 are defined by two pairs of parallel lines 511 and 512, and 521 and 522 respectively crossing, in a horizontal direction and a vertical direction, vertices of a rectangle having a maximum inscribed in the distorted quadrangle 501.

Moreover, in the example illustrated in FIG. 6, the maximum 16:9 rectangle 602 is set with a center of the presentation image as a center of the distorted quadrangle 601. The center of the distorted quadrangle 601 is an intersection point of diagonal lines 611, 612. The 16:9 rectangle 602 is inscribed in the distorted quadrangle 601 with such an intersection point as a center. Moreover, in the example illustrated in FIG. 7, the maximum 16:9 rectangle 702 is set with a center of gravity of the distorted quadrangle 701 as a center. In the example illustrated in FIG. 7, the center of gravity of the distorted quadrangle 701 is an intersection point of line segments 711, 712 connecting midpoints of opposing two sides.

Figure 8:
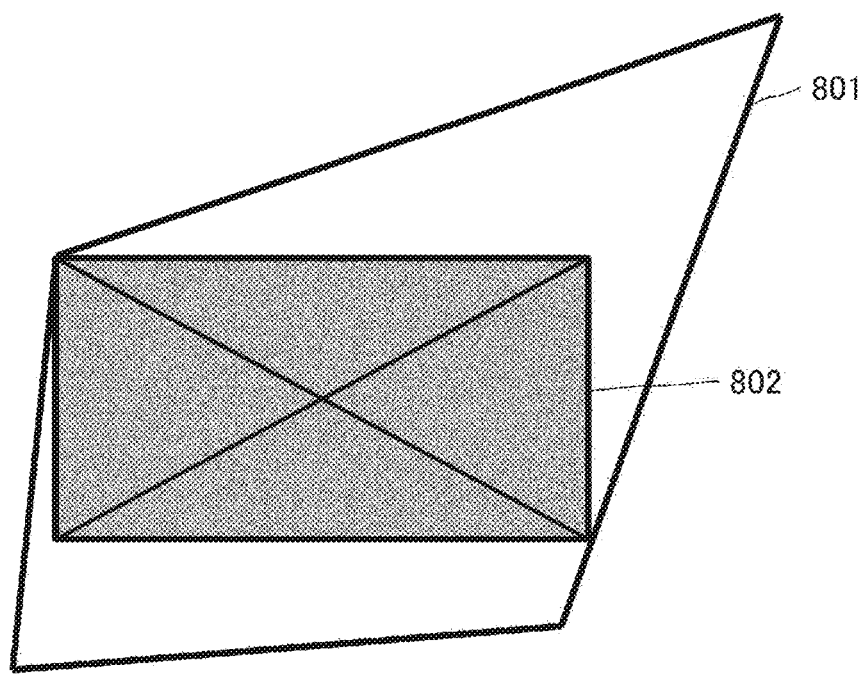
FIG. 8 is a diagram illustrating a situation in which geometrical distortion has been corrected so that a maximum 16:9 rectangle 802 inside a distorted quadrangle becomes a projection image after correction.

However, the 16:9 rectangles 502, 602, 702 searched for in any method are not 16:9 rectangles having a maximum area inside the distorted quadrangles 501, 601, 701, respectively. When geometrical distortion correction is performed on an input image so that a 16:9 rectangle 802 having a maximum area inside a distorted quadrangle 801 becomes a presentation image, as illustrated in FIG. 8, it is possible to effectively utilize an area projectable on a screen by the projection-type image display device 100. The following will describe an example of a method of searching for a rectangle having a maximum area with an aspect ratio of 16:9 inside a distorted quadrangle.

Figure 9:
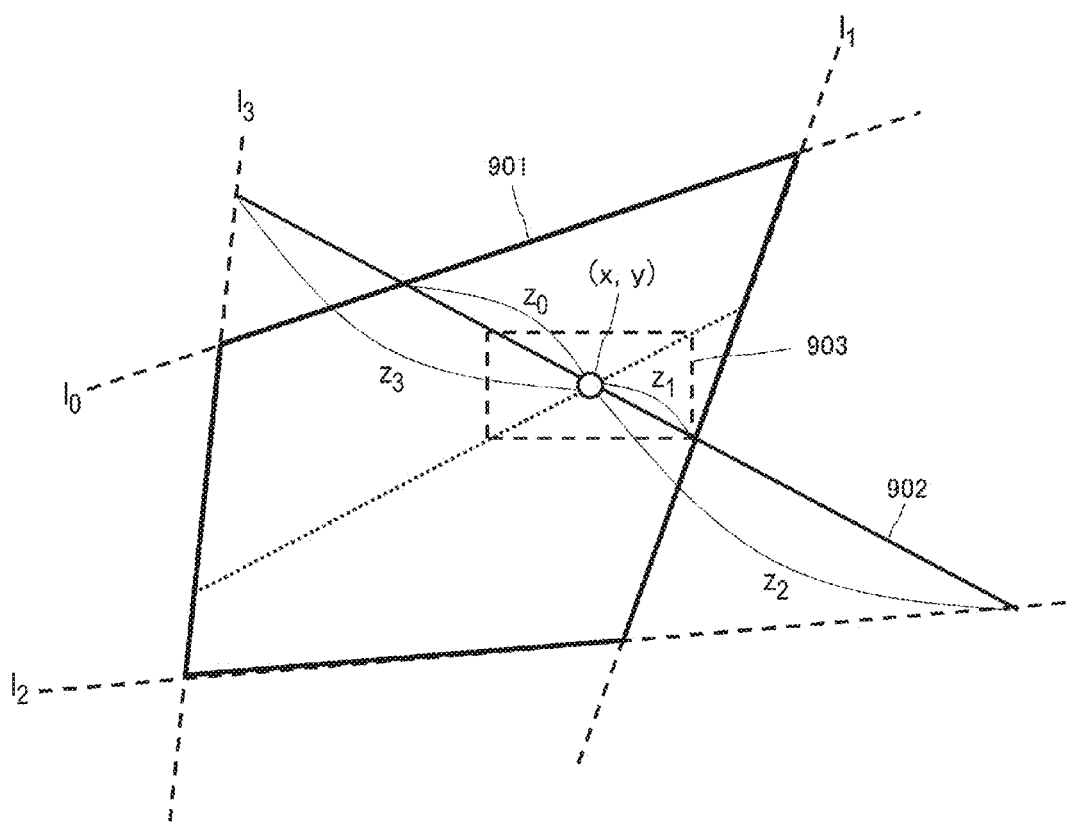
FIG. 9 is a diagram illustrating a 16:9 rectangle 903 having a maximum area with a center position (x, y) determined inside a distorted quadrangle 901.

When the center position of a 16:9 rectangle is determined inside a distorted quadrangle, a maximum 16:9 rectangle inscribed in the distorted quadrangle with such a center position can be determined uniquely. FIG. 9 illustrates a method of searching for a 16:9 rectangle 903 having a maximum area with a center position (x, y) determined inside a distorted quadrangle 901. Here, an xy plane is a screen plane on which the projection unit 101 performs projection.

Straight lines constituting sides of the distorted quadrangle 901 are represented with $l_o$ to $l_3$, and intersection points between one diagonal line 902 from the center position (x, y) of a 16:9 quadrangle and each of the straight lines $l_0$ to $l_3$ are represented with $z_0$ to $z_3$. The 16:9 rectangle 903 having a distance from the center position (x, y) to the closest intersection point $z_1$ as a diagonal line is a 16:9 rectangle having a maximum area with the center position (x, y). The position $(x_{max}, y_{max})$ at which a minimum value of a distance to the sides $l_0$ to $l_3$ of the distorted quadrangle 901 becomes maximum allows a 16:9 rectangle having a maximum area inside the distorted quadrangle 901.

Therefore, when a center position $(x_{max}, y_{max})$ at which a minimum value of a distance to the sides $l_0$ to $l_3$ of the distorted quadrangle 901 becomes maximum is searched for in the distorted quadrangle 901, and a maximum 16:9 rectangle inscribed in the distorted quadrangle 901 with such a center position $(x_{max}, y_{max})$ is determined, such a 16:9 rectangle is a 16:9 rectangle having a maximum area inside the distorted quadrangle 901.

First, a boundary condition for searching for a center position of a 16:9 rectangle having a maximum area inside a distorted quadrangle is calculated regarding each side of the distorted quadrangle. The method of calculating a boundary condition regarding a side n of the distorted quadrangle will be described with reference to FIG. 10 to FIG. 12.

Figure 10:
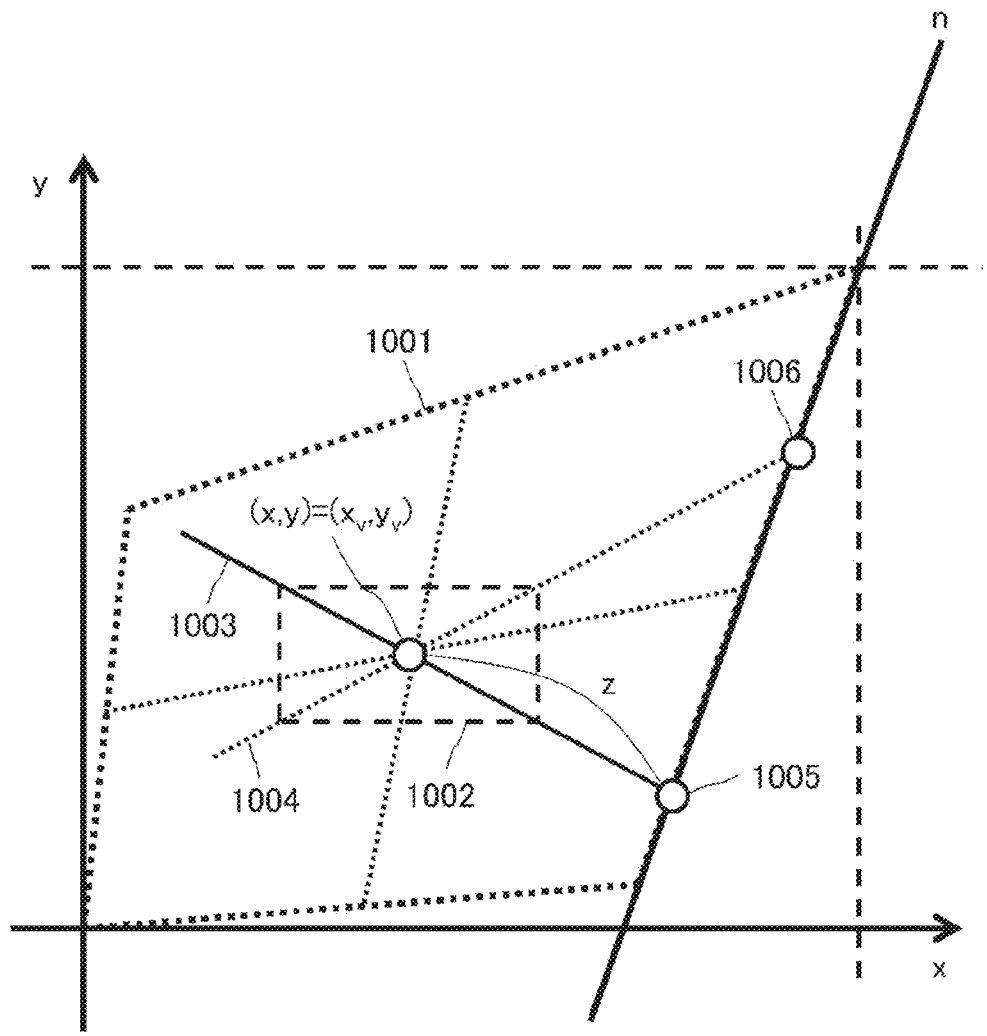
FIG. 10 is a diagram for explaining a method of calculating a boundary condition for searching for a maximum 16:9 rectangle inscribed in a distorted quadrangle.

Here, as illustrated in FIG. 10, an arbitrary point (x, y) inside a distorted quadrangle 1001 is set as a center position of a 16:9 rectangle 1002. The following sets, for convenience of description, the 16:9 rectangle 1002 having a position of a center of gravity $(x_v, y_v)$ of the distorted quadrangle 1001 as a center position (x, y). The position of a center of gravity $(x_v, y_v)$ here may be an average point of four vertices of the distorted quadrangle 1001, for example.

Of intersection points 1005, 1006 between each of diagonal lines 1003, 1004 from the center position (x, y) of the 16:9 rectangle 1002 and a side n of the distorted quadrangle 1001, one intersection closer to the center position (x, y) is z, and the relational expression (1) satisfied by the (x, y, z) is found. Here, an xy plane is a screen plane on which the projection unit 101 performs projection. Here, parameters are found so that the point (x, y, 0) satisfies the following inequality (2).

$$A_n x + B_n y + C_n z + D_n = 0 \qquad (1)$$

$$A_n x + B_n y + C_n z + D_n \leq 0 \qquad (2)$$

Figure 11:
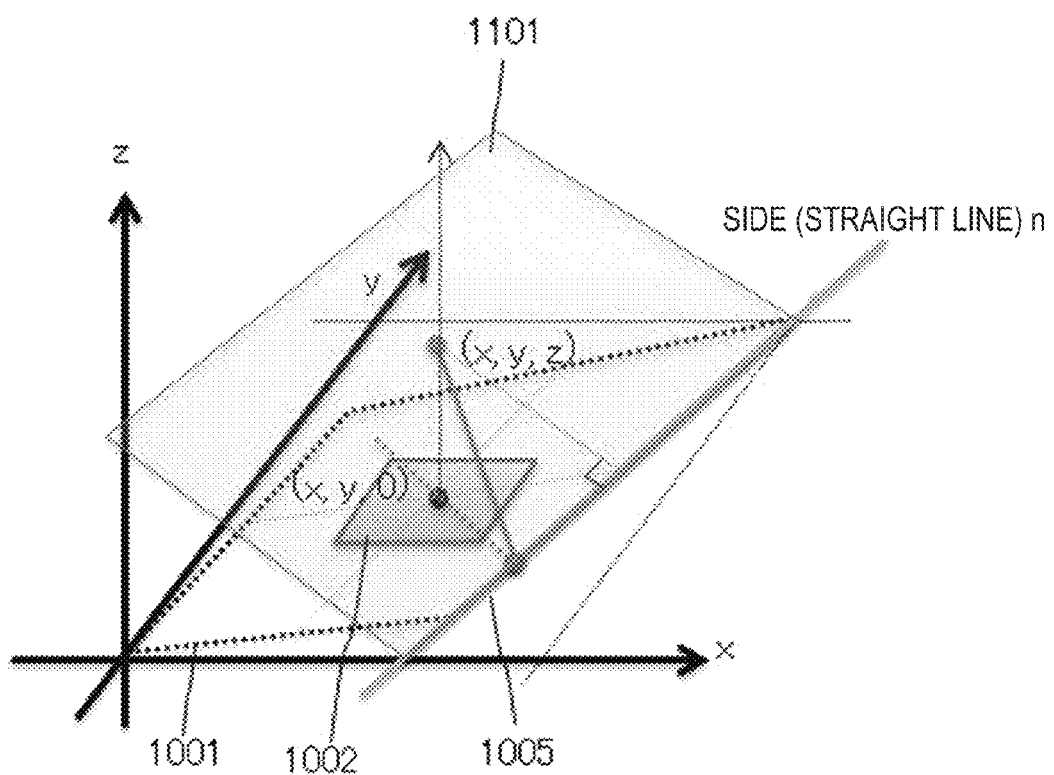
FIG. 11 is a diagram for explaining a method of calculating a boundary condition for searching for a maximum 16:9 rectangle inscribed in a distorted quadrangle.

The relational expression (1) described above is an equation representing a plane 1101 in three-dimensional space, that is, a boundary plane, with a distance between the center position (x, y, 0) of the 16:9 rectangle 1002 and the intersection point 1005 as a z axis vertical to the screen plane xy. As illustrated in FIG. 11, the plane 1101 includes both the side n and the point (x, y, z).

Above the plane 1101 represented by the above-described relational expression (1), a diagonal line of the 16:9 rectangle is exposed to the outside of the distorted quadrangle 1001. Therefore, the lower side than the plane 1101, that is, the above-described inequity (2) is one of boundary conditions for finding a center position of the 16:9 rectangle regarding the side n.

In the above, the boundary condition represented by the iniquity (2) is found focusing on the side n of the distorted quadrangle 1001, with reference to FIG. 10 and FIG. 11. The boundary conditions regarding the respective sides $l_0$ to $l_3$ of the distorted quadrangle 901 are represented as the following expressions (3) to (6).

$$A_0 x + B_0 y + C_0 z + D_0 \leq 0 \qquad (3)$$

$$A_1 x + B_1 y + C_1 z + D_1 \leq 0 \qquad (4)$$

$$A_2 x + B_2 y + C_2 z + D_2 \leq 0 \qquad (5)$$

$$A_3 x + B_3 y + C_3 z + D_3 \leq 0 \qquad (6)$$

The boundary conditions represented by the above-described expressions (3) to (6) are described by the form of the equation representing a boundary plane in three-dimensional space including a point (x, y, z) with a z axis that is a distance from the center position (x, y 0) to an intersection point between a diagonal line of the 16:9 rectangle with the center position (x, y, 0) set inside the distorted quadrangle and the corresponding side $l_0$ to $l_3$, and the corresponding side $l_0$ to $l_3$. Moreover, the above expressions (3) to (6) are boundary conditions so that, with a position of a center of gravity $(x_v, y_v)$ of the distorted quadrangle as a center position (x, y), a minimum value of a distance, in a direction of a diagonal line of the 16:9 rectangle, to each of the sides $l_0$ to $l_3$ of the distorted quadrangle becomes maximum.

As a center position of the 16:9 rectangle, there may be searched-for (x, y) allowing a largest z while satisfying all boundary conditions represented by the above-expressions (3) to (6). When the center position (x, y) of the 16:9 rectangle is determined, a maximum 16:9 rectangle inscribed in the distorted quadrangle with such a position can be determined uniquely, and such a 16:9 rectangle is a 16:9 rectangle having a maximum area. The search of the center position (x, y) of the 16:9 rectangle is a linear programming problem.

The following will describe an example of the method of calculating a center of a 16:9 rectangle based on the boundary conditions represented by the above-described expressions (3) to (6). The boundary conditions represented by the above-described expressions (3) to (6) correspond to four planes each passing the focused one point (x, y, z) and a focused side of the distorted quadrangle. It is geometrically clear that three non-parallel planes cross at one point. For example, an intersection line of two planes among three planes may be found to calculate an intersection point between the intersection line and the remaining one plane.

Figure 12:
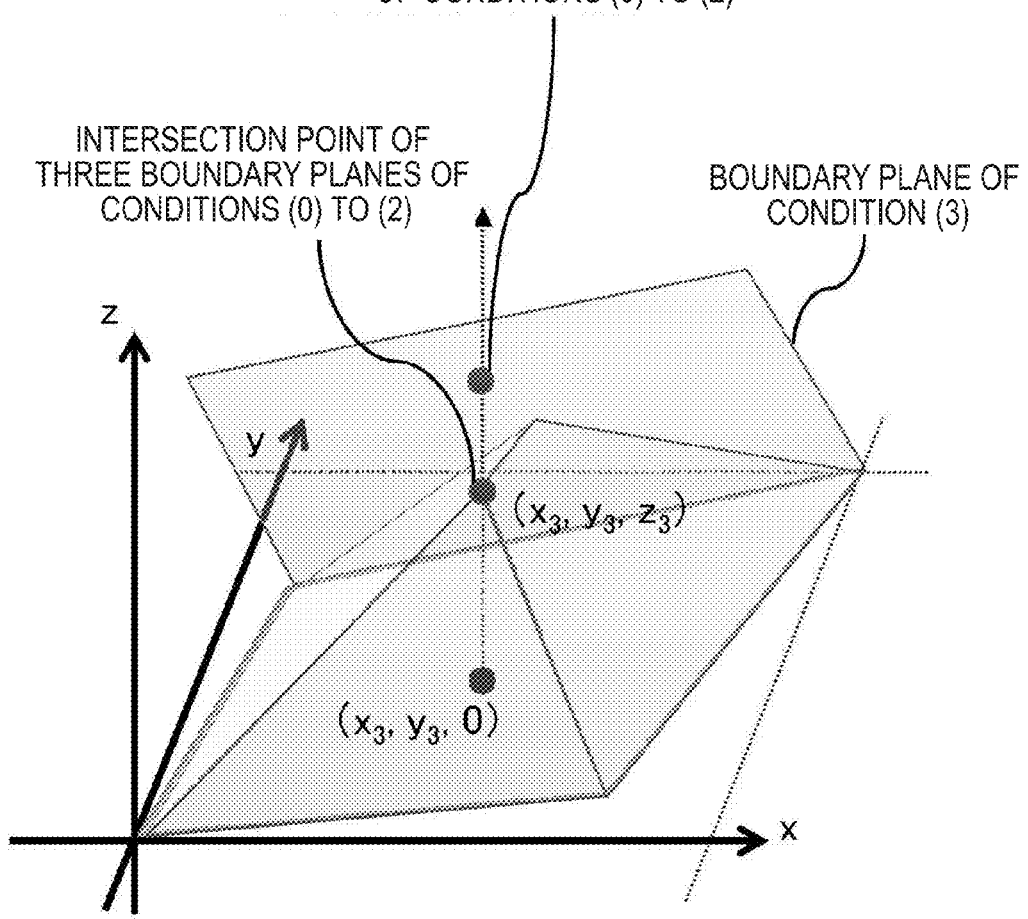
FIG. 12 is a diagram for explaining a method of calculating a boundary condition for searching for a maximum 16:9 rectangle inscribed in a distorted quadrangle.

For example, an intersection point $(x_3, y_3, z_3)$ of three boundary planes represented respectively by the three boundary conditions (0) to (2) other than the boundary condition (3) is calculated, and $z_3$ is set as a candidate of a maximum value of z. Then, $(x_3, y_3)$ at that time is substituted in the expression of the remaining boundary condition (3) to find an intersection point $(x_3, y_3, z_3')$ between a straight line parallel to the z axis passing the point $(x_3, y_3, 0)$ and a boundary plane represented by the expression (3), and $z_3$ is compared with $z_3'$. In other words, it is checked whether the intersection point $(x_3, y_3, z_3)$ of three boundary planes satisfies the remaining boundary condition (3). When $z_3$ is smaller than $z_3'$ and the intersection point $(x_3, y_3, z_3)$ satisfies the remaining boundary condition (3), $z_3$ is set as a candidate of a maximum value of z. When the intersection point $(x_3, y_3, z_3)$ does not satisfy the remaining boundary condition (3), $z_3'$ is substituted in $z_3$ as a candidate of a maximum value of z. FIG. 12 exemplifies a situation in which the intersection point $(x_3, y_3, z_3)$ of three boundary planes satisfies the remaining boundary condition (3).

Similarly, an intersection $(x_0, y_0, z_0)$ of three boundary planes represented respectively by the three boundary conditions (1) to (3) other than the boundary condition (0) is calculated, and it is checked whether $z_0$ satisfies the remaining boundary condition (0) with $(x_0, y_0)$ at that time to obtain a candidate $z_0$ of a maximum value of z.

Moreover, an intersection $(x_1, y_1, z_1)$ of three boundary planes represented respectively by the three boundary conditions (2), (3), (0) other than the boundary condition (1) is calculated, and it is checked whether $z_1$ satisfies the remaining boundary condition (1) with $(x_1, y_1)$ at that time to obtain a candidate $z_1$ of a maximum value of z.

Moreover, an intersection $(x_2, y_2, z_2)$ of three boundary planes represented respectively by the three boundary conditions (3), (0), (1) other than the boundary condition (2) is calculated, and it is checked whether $z_2$ satisfies the remaining boundary condition (2) with $(x_2, y_2)$ at that time to obtain a candidate $z_2$ of a maximum value of z.

Figure 13:
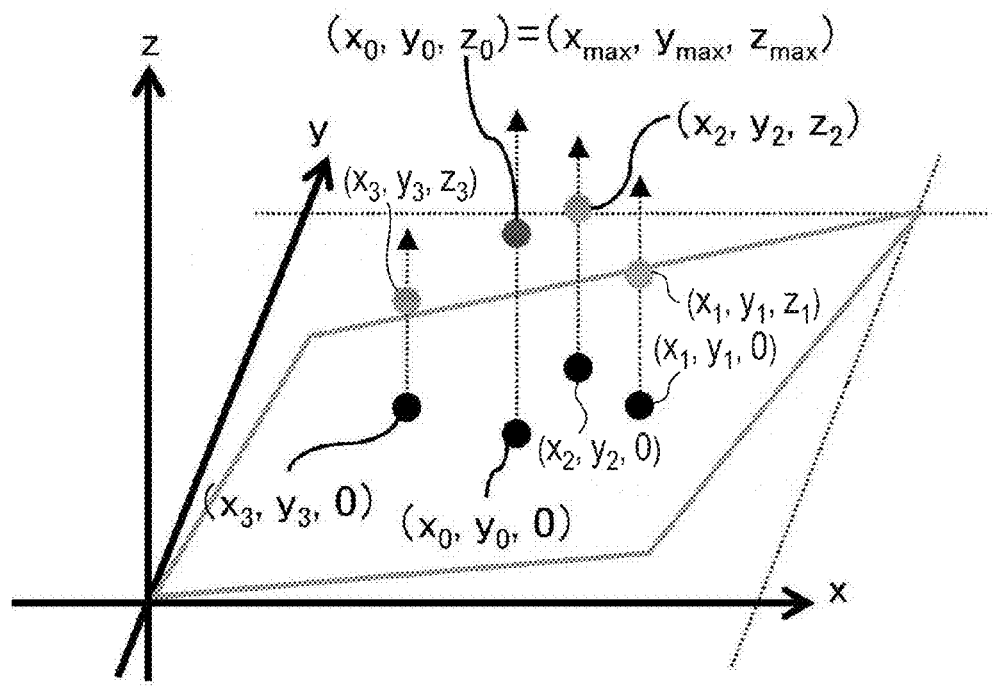
FIG. 13 is a diagram exemplifying four solution candidates calculated for respective sides of a distorted quadrangle 1301.
Figure 14:
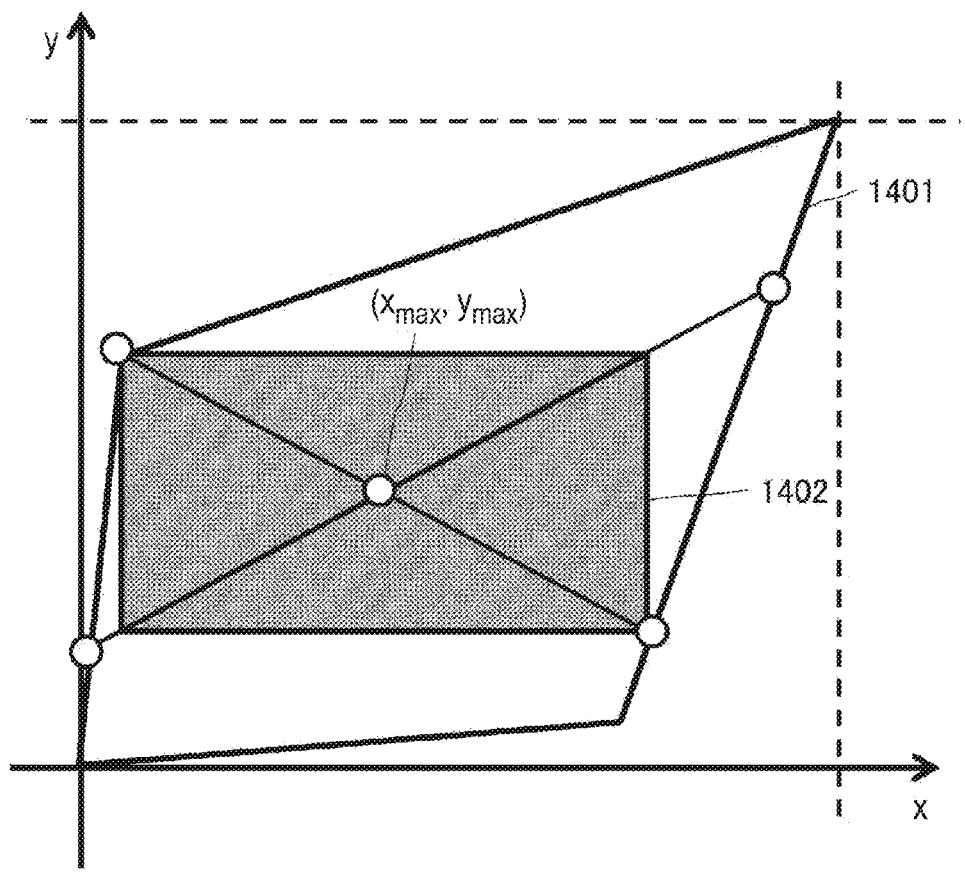
FIG. 14 is a diagram exemplifying a 16:9 rectangle having a maximum area inscribed in a distorted quadrangle.

In this manner, four candidates $z_0, z_1, z_2, z_3$ of a maximum value of z are determined. FIG. 13 exemplifies four points $(x_0, y_0, z_0), (x_1, y_1, z_1), (x_2, y_2, z_2), (x_3, y_3, z_3)$ representing four solution candidates calculated for respective sides of a distorted quadrangle 1301. In the example illustrated in FIG. 13, the $z_0$ of the point $(x_0, y_0, z_0)$ is maximum, and thus such a point is selected as an optimum solution $(x_{max}, y_{max}, z_{max})$. Then, $(x_{max}, y_{max})$ corresponding to the optimum solution is a center position of a 16:9 rectangle having a maximum area inscribed in the distorted quadrangle. The maximum 16:9 rectangle inscribed in the distorted quadrangle with the center position $(x_{max}, y_{max})$ is determined uniquely. FIG. 14 exemplifies a 16:9 rectangle 1402 having a maximum area inscribed in a distorted quadrangle 1401.

In the examples illustrated in FIG. 10 to FIG. 14, the position of a center of gravity $(x_v, y_v)$ of the distorted quadrangle is focused on, and the center position (x, y) of a 16:9 rectangle is set to such a point to search a maximum inscribed rectangle. However, even when an arbitrary point other than the position of a center of gravity $(x_v, y_v)$ inside the distorted quadrangle is focused on, a maximum inscribed rectangle can be searched for in the same manner. In the configuration of the correction amount detection unit 105 illustrated in FIG. 4, when position information of four vertices of a distorted quadrangle calculated by the feature point calculation unit 403 is input to calculate a 16:9 rectangle having a maximum area inscribed in the distorted quadrangle following the procedure explained with reference to FIG. 10 to FIG. 14, the projective transformation parameter calculation unit 404 finds a projective transformation matrix for projective transformation of the distorted quadrangle to a 16:9 rectangle, and outputs the projective transformation matrix to the image correction unit 303, for example.

Figure 15:
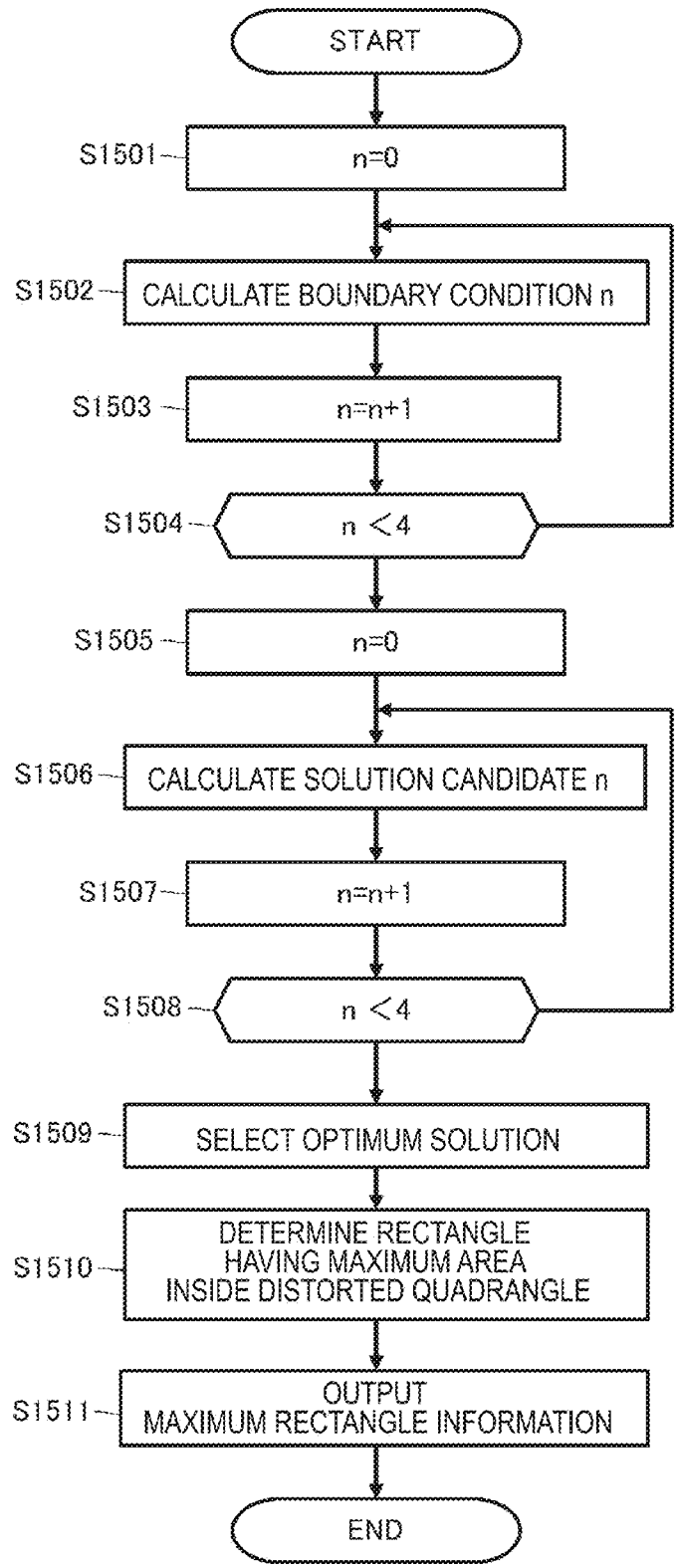
FIG. 15 is a flowchart illustrating a processing procedure for searching for a rectangle having a maximum area with a given aspect ratio that is inscribed in a distorted quadrangle.

FIG. 15 illustrates, in the form of a flowchart, a processing procedure for searching for a maximum rectangle with a given aspect ratio inscribed in a distorted quadrangle. The processing procedure illustrated in FIG. 15 is performed by the projective transformation parameter calculation unit 404, for example. First, an initial value 0 is substituted in n (Step S1501), and a center position (x, y) of a rectangle is set to an arbitrary position inside a distorted quadrangle (a position of a center of gravity of the distorted quadrangle, for example). Then, a boundary condition (n) regarding a side n of the distorted quadrangle is calculated (Step S1502). To be more specific, when an intersection having a shortest distance to the center position (x, y), among intersections between a diagonal line of a rectangle and the side n of the distorted quadrangle, is set as z, the boundary condition (n) regarding the side n is calculated based on the relational expression satisfied by (x, y, z). Subsequently, 1 is added to n (Step S1503), and the processing returns to Step S1502 until n reaches 4 (No at Step S1504), so that boundary conditions regarding all sides of the distorted quadrangle are calculated.

In the embodiment, there is calculated a boundary condition regarding the side n by the form of the equation representing a plane in three-dimensional space including a point (x, y, z) with a z axis that is a distance from the center position (x, y, 0) to an intersection point between a diagonal line of the 16:9 rectangle with the center position (x, y, 0) set arbitrarily inside the distorted quadrangle and the side n, and the side n. Next, the initial value 0 is substituted again in n (Step S1505), and a solution candidate n satisfying boundary conditions of all sides other than the side n is calculated (Step S1506).

In the embodiment, the smaller z of either a largest z satisfying the boundary conditions regarding all sides other than the side n or a z satisfying the boundary condition regarding the side n with (x, y) at that time, is set as a solution candidate (see FIG. 12, for example). Moreover, in the embodiment, a z of an intersection point of boundary planes representing boundary conditions regarding all sides other than the side n is found by geometric calculation, as a largest z satisfying the boundary conditions regarding all sides other than the side n (see FIG. 12, for example). Then, 1 is added to n (Step S1507), and the processing returns to Step S1506 until n reaches 4 (No at Step S1508), so that solution candidates regarding all sides of the distorted quadrangle are calculated.

Next, an optimum solution is selected among the solution candidates calculated regarding respective sides of the distorted quadrangle (Step S1509), and a 16:9 rectangle having a maximum area inside the distorted quadrangle is determined based on the optimum solution (Step S1510). With a solution candidate allowing a largest z among the solution candidates, a minimum value of a distance, in a direction of a diagonal line, to a side of the distorted quadrangle becomes maximum. Thus, when a maximum 16:9 rectangle inscribed in the distorted quadrangle with a point $(x_{max}, y_{max})$ at that time as a center position is searched for, such a 16:9 rectangle is a 16:9 rectangle having a maximum area inside the distorted quadrangle.

Figure 16:
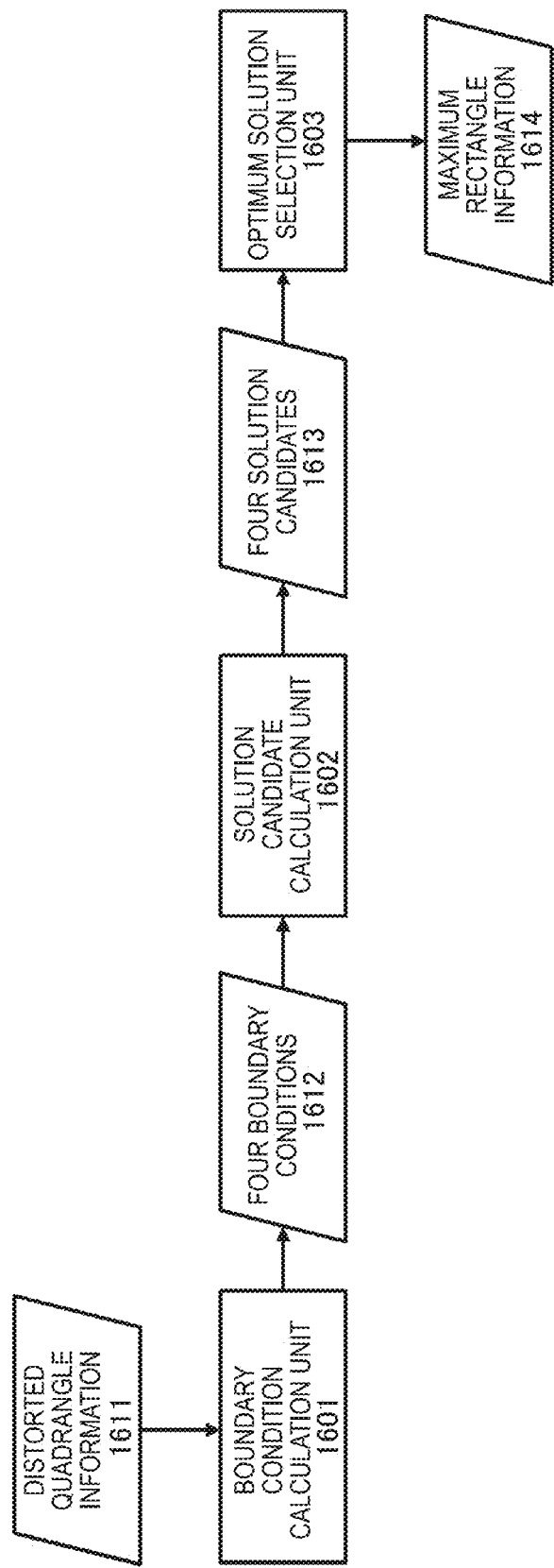
FIG. 16 is a diagram schematically illustrating a functional configuration for searching for a rectangle having a maximum area with a given aspect ratio that is inscribed in a distorted quadrangle.

Then, maximum rectangle information is output (Step S1511). A projective transformation matrix for projective transformation of the distorted quadrangle to the 16:9 rectangle having a maximum area is correction parameters. The projective transformation is performed on the input image, whereby it is possible to project a presentation image of the 16:9 rectangle having a maximum area on a screen. FIG. 16 schematically illustrates a functional configuration for searching for a rectangle having a maximum area with a given aspect ratio that is inscribed in a distorted quadrangle.

A boundary condition calculation unit 1601 inputs distorted quadrangle information 1611. The distorted quadrangle information 1611 includes position information of four vertices of a distorted quadrangle projected on a screen, for example. For example, when the projection unit 101 projects a test pattern on a screen, the camera unit 104 photographs the projection image, and the feature point calculation unit 403 calculates position information of the four vertices as feature points. In this manner, the distorted quadrangle information 1611 is obtained.

Then, the boundary condition calculation unit 1601 calculates boundary conditions 1612 regarding four sides of the distorted quadrangle. When an intersection having a shortest distance to the center position (x, y), among intersections between a diagonal line of a rectangle and a side n of the distorted quadrangle, is set as z, the boundary condition calculation unit 1601 calculates the boundary condition (n) regarding the side n based on the relational expression satisfied by (x, y, z). In the embodiment, the boundary condition calculation unit 1601 calculates a boundary condition regarding the side n by the form of the equation representing a plane in three-dimensional space including a point (x, y, z) with a z axis that is a distance from the center position (x, y, 0) to an intersection point between a diagonal line of the 16:9 rectangle with the center position (x, y, 0) set arbitrarily inside the distorted quadrangle and the side n, and the side n.

A solution candidate calculation unit 1602 calculates a solution candidate 1613 satisfying boundary conditions of all sides other than a focused side, regarding each side of the distorted quadrangle. In the embodiment, the smaller z of either a largest z satisfying the boundary conditions regarding all sides other than the side n or a z satisfying the boundary condition regarding the side n with (x, y) at that time, is set as a solution candidate (see FIG. 12, for example). Moreover, in the embodiment, a z of an intersection point of boundary planes representing boundary conditions regarding all sides other than the side n is found by geometric calculation, as a largest z satisfying the boundary conditions regarding all sides other than the side n (see FIG. 12, for example).

An optimum solution selection unit 1603 selects an optimum solution among solution candidates calculated for respective sides of the distorted quadrangle. With a solution candidate 1613 allowing a largest z among the solution candidates 1613, a minimum value of a distance, in a direction of a diagonal line, to a side of the distorted quadrangle becomes maximum. Thus, when a maximum 16:9 rectangle inscribed in the distorted quadrangle with a point ($x_{max}$, $y_{max}$) at that time as a center position is searched for, such a 16:9 rectangle is a 16:9 rectangle having a maximum area inside the distorted quadrangle.

Then, the optimum solution selection unit 1603 determines a 16:9 rectangle having a maximum area inside the distorted quadrangle based on the optimum solution, and outputs it as maximum rectangle information 1614. A projective transformation matrix for projective transformation of the distorted quadrangle to the 16:9 rectangle having a maximum area is correction parameters. The projective transformation is performed on the input image, whereby it is possible to project a presentation image of the 16:9 rectangle having a maximum area on a screen.

As described above, the projection-type image display device 100 according to the embodiment performs geometrical distortion correction so that an area of a projection image of the projection unit 101 becomes maximum. Thus, it is possible to effectively utilize an area projectable on a screen by the projection-type image display device 100. Moreover, the projection-type image display device 100 according to the embodiment can calculate a rectangle with a desirable aspect ratio inscribed in an area projectable on a screen by the projection unit 101 (a distorted quadrangle), by simple searching processing.

In the above, the technology disclosed in the present specification has been described in detail with reference to the certain embodiment. However, it is obvious that a person skilled in the art can modify or substitute the embodiment without departing from the scope of the technology disclosed in the specification.

In the specification, the embodiment of the projection-type image display device incorporating a camera has been described. Even when a camera is configured to be separable from a body of a projection-type image display device or connected externally to the body, or when a camera is substituted by a method of measuring a position or a size of a projection image based on three-dimensional position relation between a projection unit and a screen, for example, the technology disclosed in the specification can be applied in the same manner.

In short, the technology disclosed in the specification has been described using the example, and the description contents of the specification should not be interpreted restrictively. In order to determine the scope of the technology disclosed in the specification, the claims should be taken into consideration.

Additionally, the present technology may also be configured as below.
(1) An image processing method including:
detecting a distorted image before correction projected on a screen by a projection-type image display device;
searching for a same shape as an input image having a maximum area inside the distorted image; and
correcting the input image in a manner that the distorted image becomes the searched-for shape having the maximum area.
(2) The image processing method according to (1),
wherein the detecting step detects the distorted image based on an image obtained by photographing the distorted image before correction projected on the screen with a camera, or three-dimensional position relation between the projection-type image display device and the screen.
(3) The image processing method according to (1),
wherein the detecting step detects a position and a size of a distorted quadrangle projected on the screen, and
wherein the searching step searches for a rectangle having the maximum area with a same aspect ratio as the input image, inside the distorted quadrangle.
(4) The image processing method according to (3),
wherein the searching step searches for a center position from which a minimum value of a distance, in a direction of a diagonal line to a side of the distorted quadrangle, is maximum, and determines a maximum rectangle with the aspect ratio inscribed in the distorted quadrangle with the center position, as the rectangle having the maximum area.
(5) The image processing method according to (4),
wherein the searching step calculates boundary conditions for searching for the center position regarding respective sides of the distorted quadrangle, searches for the center position from which a minimum value of distances, in a direction of a diagonal line to the respective sides of the distorted quadrangle, is maximum, and determines the maximum rectangle with the aspect ratio inscribed in the distorted quadrangle with the center position, the center position satisfying all boundary conditions.
(6) The image processing method according to (5),
wherein the searching step calculates a boundary condition regarding a side n by a form of an equation representing a boundary plane in a three-dimensional space including the side n and a point (x, y, z) with a z axis that is a distance from the center position (x, y, 0) to an intersection point between the side n and a diagonal line of the rectangle with the center position (x, y, 0) set arbitrarily inside the distorted quadrangle.
(7) The image processing method according to (6),
wherein the searching step calculates, for each side, a solution candidate satisfying all the boundary conditions regarding sides other than a focused side, and selects an optimum solution among the solution candidates of respective sides.
(8) The image processing method according to (7),
wherein the searching step sets, as the solution candidate regarding the focused side, a smaller z of either a largest z satisfying the boundary conditions regarding all the sides other than the focused side or a z satisfying the boundary condition regarding the focused side with (x, y) at that time.
(9) The image processing method according to (8),
wherein the searching step calculates a z of an intersection point of three boundary planes respectively representing the boundary conditions regarding all the sides other than the focused side, as a largest z satisfying the boundary conditions regarding all the sides other than the focused side.
(10) The image processing method according to (8) or (9),
wherein the searching step selects a solution candidate allowing a largest z among all the solution candidates calculated for respective sides, as an optimum solution, and finds, as the rectangle having the maximum area, a maximum rectangle inscribed in the distorted quadrangle with (x, y) corresponding to the optimum solution as the center position.

(11) An image projection device including:
a projection unit configured to project an input image;
a detection unit configured to detect a distorted image before correction projected on a screen by a projection-type image display device;
a search unit configured to search for a same shape as the input image having a maximum area inside the distorted image; and
a correction unit configured to correct the input image in a manner that the distorted image becomes the searched-for shape having the maximum area.

(12) The image projection device according to (11),
wherein the detection unit detects a position and a size of a distorted quadrangle projected on the screen, and
wherein the search unit includes a boundary condition calculation unit configured to calculate boundary conditions regarding four sides of the distorted quadrangle, a solution candidate calculation unit configured to calculate, for each side of the distorted quadrangle, a solution candidate satisfying the boundary conditions of all sides other than a focused side, and an optimum solution selection unit configured to select an optimum solution among the solution candidates calculated for the respective sides of the distorted quadrangle.

(13) The image projection device according to (12),
wherein the boundary condition calculation unit calculates a boundary condition regarding a side n by a form of an equation representing a boundary plane in a three-dimensional space including the side and a point (x, y, z) with a z axis that is a distance from the center position (x, y, 0) to an intersection point between the side n and a diagonal line of a rectangle with the center position (x, y, 0) set arbitrarily inside the distorted quadrangle.

(14) The image projection device according to (13),
wherein the solution candidate calculation unit sets, as the solution candidate regarding the focused side, a smaller z of either a largest z satisfying the boundary conditions regarding all the sides other than the focused side or a z satisfying the boundary condition regarding the focused side with (x, y) at that time.

(15) The image projection device according to (14),
wherein the optimum solution selection unit selects a solution candidate allowing a largest z among all the solution candidates calculated for respective sides, as an optimum solution, and finds, as a rectangle having a maximum area, a maximum rectangle inscribed in the distorted quadrangle with (x, y) corresponding to the optimum solution as the center position.

What is claimed is:

1. An image processing method, comprising:
detecting a distorted image before correction projected on a screen by a projection-type image display device;
detecting a position and a size of a distorted quadrangle projected on the screen;
searching for a same shape as an input image having a maximum area inside the distorted image;
searching for a rectangle having the maximum area with a same aspect ratio as the input image inside the distorted quadrangle;
searching for a center position from which a minimum value of a distance, in a direction of a diagonal line to a side of the distorted quadrangle, is maximum;
determining a maximum rectangle with the same aspect ratio inscribed in the distorted quadrangle with the center position, as the rectangle having the maximum area; and
correcting the input image in a manner that the distorted image becomes the searched-for shape having the maximum area.

2. The image processing method according to claim 1,
further comprising detecting the distorted image based on an image obtained by photographing the distorted image before correction projected on the screen with a camera, or three-dimensional position relation between the projection-type image display device and the screen.

3. The image processing method according to claim 1,
further comprising calculating boundary conditions for searching for the center position regarding respective sides of the distorted quadrangle, searching for the center position from which a minimum value of distances, in the direction of the diagonal line to the respective sides of the distorted quadrangle, is maximum, and determining the maximum rectangle with the same aspect ratio inscribed in the distorted quadrangle with the center position, the center position satisfying the boundary conditions.

4. The image processing method according to claim 3,
further comprising calculating a boundary condition regarding a side n by an equation representing a boundary plane in a three-dimensional space including the side n and a point (x, y, z) with a z axis that is a distance from the center position having coordinates (x, y, 0) to an intersection point between the side n and a diagonal line of the rectangle with the center position having coordinates (x, y, 0) set arbitrarily inside the distorted quadrangle.

5. The image processing method according to claim 4,
further comprising calculating, for each side, a solution candidate satisfying all the boundary conditions regarding sides other than a focused side, and selecting an optimum solution among solution candidates of respective sides.

6. The image processing method according to claim 5,
further comprising setting, as the solution candidate regarding the focused side, a smaller z of one of a largest z satisfying the boundary conditions regarding all the sides other than the focused side or a z satisfying the boundary condition regarding the focused side with (x, y) at that time.

7. The image processing method according to claim 6,
further comprising calculating a z of an intersection point of three boundary planes respectively representing the boundary conditions regarding all the sides other than the focused side, as the largest z satisfying the boundary conditions regarding all the sides other than the focused side.

8. The image processing method according to claim 6,
further comprising selecting a solution candidate allowing the largest z among all the solution candidates calculated for respective sides, as the optimum solution, and finding, as the rectangle having the maximum area, the maximum rectangle inscribed in the distorted quadrangle with (x, y) corresponding to the optimum solution as the center position.

9. An image projection device, comprising:
a projection unit configured to project an input image;
a detection unit configured to:

detect a distorted image before correction projected on a screen by a projection-type image display device, and detect a position and a size of a distorted quadrangle projected on the screen;

a search unit configured to search for a same shape as the input image having a maximum area inside the distorted image;

a boundary condition calculation unit configured to calculate boundary conditions regarding four sides of the distorted quadrangle;

a solution candidate calculation unit configured to calculate, for each of the four sides of the distorted quadrangle, a solution candidate satisfying the boundary conditions of all sides other than a focused side;

an optimum solution selection unit configured to select an optimum solution among solution candidates calculated for the four sides of the distorted quadrangle; and a correction unit configured to correct the input image in a manner that the distorted image becomes the searched-for shape having the maximum area.

10. The image projection device according to claim 9, wherein the boundary condition calculation unit is further configured to calculate a boundary condition regarding a side n by an equation representing a boundary plane in a three-dimensional space including the side n and a point (x, y, z) with a z axis that is a distance from the center position with coordinates (x, y, 0) to an intersection point between the side n and a diagonal line of a rectangle with the center position with coordinates (x, y, 0) set arbitrarily inside the distorted quadrangle.

11. The image projection device according to claim 10, wherein the solution candidate calculation unit is further configured to set, as the solution candidate regarding the focused side, a smaller z of one of a largest z satisfying the boundary conditions regarding all the sides other than the focused side or a z satisfying the boundary condition regarding the focused side with (x, y) at that time.

12. The image projection device according to claim 11, wherein the optimum solution selection unit is further configured to select a solution candidate allowing the largest z among all the solution candidates calculated for respective sides, as the optimum solution, and find, as the rectangle having the maximum area, the maximum rectangle inscribed in the distorted quadrangle with (x, y) corresponding to the optimum solution as the center position.

* * * * *